United States Patent

Kazama

[11] Patent Number: 6,057,985
[45] Date of Patent: May 2, 2000

[54] MAGNETIC HEAD DEVICE

[75] Inventor: Toshio Kazama, Niigata-ken, Japan

[73] Assignee: Alps Electric Co., Ltd., Japan

[21] Appl. No.: 09/041,899

[22] Filed: Mar. 13, 1998

[30] Foreign Application Priority Data

Mar. 21, 1997 [JP] Japan ................................. 9-068687
Mar. 27, 1997 [JP] Japan ................................. 9-075902

[51] Int. Cl.[7] .............................. G11B 5/48; G11B 21/16
[52] U.S. Cl. ........................................................ 360/104
[58] Field of Search ..................................... 360/103, 104

[56] References Cited

U.S. PATENT DOCUMENTS

| | | |
|---|---|---|
| 3,349,384 | 10/1967 | Kohn . |
| 3,665,434 | 5/1972 | Applequist et al. ................... 360/103 |
| 4,328,521 | 5/1982 | Pexton et al. ........................... 360/104 |
| 5,237,475 | 8/1993 | Kazama et al. . |
| 5,299,080 | 3/1994 | Mizuno et al. . |
| 5,333,085 | 7/1994 | Prentice et al. ........................ 360/104 |
| 5,367,419 | 11/1994 | Kazama . |
| 5,535,075 | 7/1996 | Takahashi et al. ..................... 360/105 |
| 5,657,300 | 8/1997 | Takahashi ................................ 369/13 |
| 5,771,136 | 6/1998 | Girard ..................................... 360/104 |
| 5,822,154 | 10/1998 | Takahashi et al. ..................... 360/104 |
| 5,838,517 | 11/1998 | Frater et al. ........................... 360/104 |
| 5,877,920 | 3/1999 | Resh ....................................... 360/104 |

FOREIGN PATENT DOCUMENTS 58-006552  1/1983  Japan .
1-128277   5/1989  Japan .

*Primary Examiner*—William Klimowicz
*Attorney, Agent, or Firm*—Brinks, Hofer, Gilson & Lione

[57] ABSTRACT

A magnetic head device in which one end of a load beam is bent to form a stepped portion, and a vertical bent surface and a pivot are integrally formed. The vertical bent surface provides a load beam height with respect to the head body 1. A fulcrum, the top portion of the pivot, and virtually the center of a head body are lined up in a straight line in the vertical direction, so that the floating force acting on the head body acts vertically on the fulcrum, so that a moment is not produced. Therefore, the floating posture of the head body becomes stable.

10 Claims, 7 Drawing Sheets

MAGNETIC HEAD DEVICE

BACKGROUND OF THE INVENTION

1. Field of the Invention

The present invention relates to a floating magnetic head device provided in, for example, a photo-magnetic disk apparatus, and, more particularly, to a magnetic head device which allows the head body to be supported in a stable posture with a minimum number of component parts.

2. Description of the Related Art

FIG. 8 is a partial perspective view of a conventional magnetic head device used in a photo-magnetic disk apparatus.

The magnetic head device is composed of a head body 21 and a supporting member 40 which supports the head body 21.

The head body 21 has a slider 22 which opposes a recording medium and retains a core assembly 25. In FIG. 8, the lower surface of the head body 21 corresponds to the surface opposing the recording medium, whereas the upper surface corresponds to the surface supported by the supporting member 40.

The core assembly 25 is composed of, for example, a core and a coil 30 wound around the core, with a magnetic gap (not shown) in the core assembly 25 appearing from the lower surface of the slider 22.

The supporting member 40 is composed of a load beam 41, an adapter 45, and a flexure 50.

The load beam 41 is formed of a plate spring, and has bent portions 41a at both sides thereof, which extend from the middle to one end of the load beam 41. The bent portions 41a form a rigid structure which allows the base end of the load beam 41 to be resiliently pressed by a predetermined amount. The load beam 41 has a pair of positioning holes 42.

The adapter 45 is Q-shaped, and has joint portions 46 and 47, and positioning holes 46a and 47a. With the positioning holes 46a and 47a aligned with the positioning holes 42 of the load beam 41, respectively, the adapter 45 is welded to the load beam 41. The bottom surface of the adapter 45 has a stepped portion, forming two levels thereat. A spherical pivot 49 projects downward from the higher level of the bottom surface, whereas a positioning hole 48 is formed in the lower level of the bottom surface.

The flexure 50 is formed of a thin plate spring. The positioning hole 51 is aligned with the positioning hole 48 in the adapter 45 in order to fix the flexure 50 to the adapter 45, for example, by welding or with an adhesive. The flexure 50 has protrusions 53 formed at both sides of one end thereof, and a tongue 52 formed at the center thereof. The protrusions 53 are inserted in cutouts 24a and 24b provided in the slider 22 in order to affix the tongue 52 of the flexure 50 and the slider 22 together by, for example, using an adhesive.

The upper surface of the tongue 52 of the flexure 50 is brought into contact with the pivot 49 of the adapter 45. The slider 22, due to the resiliency of the flexure 50, is capable of changing its posture freely on the top surface of the pivot 49 as fulcrum.

In general, a photo-magnetic disk is contained in a cartridge to protect its surface. When the cartridge is loaded into a disk apparatus, a shutter of the cartridge is opened, causing a window in the cartridge to be opened. The head body 21 of FIG. 8 enters into the cartridge from the window, and contacts the upper surface of the disk. When the disk in the cartridge rotates, air flowing at the upper surface of the disk causes the head body 21 to take a floating posture, causing the disk to be subjected to a vertical magnetic field through a magnetic gap in the lower surface of the slider 22. The opposite side of the disk is irradiated with laser beams in order to write information onto the disk by either optical modulation or magnetic modulation.

In the conventional magnetic head device, the adapter 45 with a height H is disposed between the load beam 41 and the flexure 50, so that the adapter 45 is used to provide a a load beam 41 height with respect to the head body 21. With the load beam disposed at the outer side of the cartridge, the head body 21, supported by the adapter 45, is capable of contacting the disk in the cartridge from the window of the cartridge.

In the magnetic head device of FIG. 8, however, in order to provide a load beam 41 height with respect to the head body 21, an adapter 45 must be provided, in addition to a load beam 41, a flexure 50, and a head body 21. Thus, a larger number of parts are required to construct the magnetic head device. In addition, an extra operation must be performed, since the adapter 45 must be aligned with the load beam 41 to affix it to the load beam 41. Further, the positioning must be done with greater precision, resulting in higher production costs.

FIG. 9 is a partial side view showing the structure of a conventional magnetic head, in which a load beam height is provided with respect to the head body without using the aforementioned adapter 45.

The load beam 60 of FIG. 9 has a vertical bent surface 61 and a parallel bent surface 62. The vertical bent surface 61 is formed by bending an end portion of the load beam 60 in a direction perpendicular to a disk D. The bent surface 62 is formed by further bending the end portion of the load beam 60 parallel to the disk D. The height of the vertical bent surface 61 is designated by reference character H. A spherical pivot 63 is formed, by molding with pressure, so as to protrude downwardly from the parallel bent surface 62.

A head body 80 is provided below the pivot 63 through a flexure 70. The top portion of the pivot 63 is in contact with the upper surface of the head body 80.

In the magnetic head device of FIG. 9, a height equal to the height H of the adapter 45 can be provided, without using the adapter 45 of FIG. 8, by simply bending one end of the lead beam 60 into the shape of a step.

In the magnetic head device shown in FIG. 9, however, the floating posture of the head body 80 becomes unstable, so that magnetic recording operations cannot be performed accurately.

As shown in FIG. 9, the floating force F acting on the head body 80 as a result of air flowing at the upper surface of the disk D acts on the pivot 63 substantially vertically in the upward direction. Point S (at the top side of the vertical bent surface 61) acts as a fulcrum at one end of the load beam 60. The center of floating force F is not on the vertical line going through the fulcrum S, causing a bending force due to a moment to act on the point S as well as a boundary T between the vertical bent surface 61 and the parallel bent surface 62, where the rigidity is low. This causes the head body 80 to tilt in a rolling direction a more often, so that, for example, the space between the disk D and the head body 80 cannot be stably maintained.

In addition, in the magnetic head device of FIG. 8, positioning holes are formed in the load beam 41, the adapter 45, and the flexure 50. These holes are brought into alignment in order to weld the load beam 41 and the adapter 45 together and to bond a mounting surface 44 of the adapter 45 and the flexure 50 together with an adhesive. Thus, a welding unit is needed to perform the welding operation, so that the manufacturing process becomes complicated, resulting in increased production costs.

Further, when an adhesive is used, the production efficiency tends to be reduced, since the adhesive takes a certain amount of time to dry up completely. In addition, the adhered component parts tend to become misaligned, when, for example, the adhesive gets deformed due to hardening immediately after the component parts are adhered together.

SUMMARY OF THE INVENTION

To overcome the above-described problems, it is an object of the present invention to provide a magnetic head device which allows a load beam height with respect to the head body to be properly provided, without using an adapter, and which allows the floating posture of the head body to be stabilized.

It is another object of the present invention to provide a magnetic head device whose flexure structure is improved so that it can be easily and reliably affixed to a mounting surface.

To these ends, according to one aspect of the present invention, there is provided a magnetic head device comprising: a head body opposing a recording medium; a flexure for supporting the head body; and a load beam having formed at one end a first bent surface, a second bent surface, and contact portion, the first bent surface formed by bending the one end of the load beam in a direction perpendicular to the recording medium, the second bent surface formed by further bending the one end of the load beam parallel to the recording medium from the first bent surface, and the contact portion extending from the first bent surface and downward from the second bent surface; wherein the flexure is affixed to the second bent surface, and one end of the contact portion contacts the upper surface of the head body; and wherein the head body is supported at the one end of the load beam through the flexure.

Although not exclusive, a cutout may be formed at the second bent surface side of a boundary between the first bent surface and the second bent surface, and the contact portion may be made to correspond to the portion formed by forming the cutout, and formed in the same plane as the first bent surface.

Although not exclusive, the top portion of the contact portion and a fulcrum at the upper side of the first bent surface may be made to line up in a straight line in a direction perpendicular to the recording medium.

According to the magnetic head device of the present invention, one end of the load beam is formed into a stepped structure, as shown in FIG. 1. An adapter, which was conventionally required, is no longer needed to provide a load beam 7 height with respect to the body 1, thus reducing the number of parts, and making it unnecessary to perform the step of aligning the adapter with respect to the load beam. As a result, costs are reduced. The stepped portion is formed by bending one end of the load beam 7 by a pressing operation. Thus, the production process is not complicated.

In addition, the pivot 10 (contact portion) is formed integrally with the first bent surface 9 so as to extend from the center of the bottom surface of the first bent surface 9 extending perpendicular to a recording medium of the load beam 7. The top portion of the pivot 10 contacts the upper surface of the head body 1. Thus, as shown in FIG. 5, the fulcrum S (at the upper side of the first bent surface 9), the top portion of the pivot 10, and virtually the center of the head body 1 are lined up vertically in a straight line. Consequently, even when a floating force acts vertically upward on the head body 1 and the pivot 10, no moment acts around the fulcrum S, thereby stabilizing the floating posture of the head body 1, and thus stably maintaining the space between the head body 1 and the disk surface at all times.

Further, as shown in FIG. 2, a cutout 15 is formed at the second bent surface 11 side of the boundary between the first bent surface 9 and the second bent surface 11. A portion which is integral with the first bent surface 9 and extends perpendicular to the recording medium is formed as a result of forming the cutout 15. This portion corresponds to the pivot 10. The pivot 10 has a flat shape, so that the portion more closely resembles a point where the head body 1 is supported, and can be formed more easily than the conventional spherically-shaped pivots.

According to a second aspect of the present invention, there is provided a magnetic head device, comprising: a head body opposing a recording medium; a flexure having a plurality of attachment pawls; and a load beam having formed at one end a mounting surface formed parallel to the recording medium; wherein the attachment pawls retain the mounting surface in order to affix the flexure to the load beam; and; wherein the head body is supported at the one end of the load beam through the flexure.

Although not exclusive, the mounting surface and the flexure may each have a positioning hole, with the positioning holes being aligned with respect to each other in order to position the flexure with respect to the mounting surface for affixing the flexure to the mounting surface.

Although not exclusive, when the flexure is viewed from directly above, the attachment pawls and the head body affixed to the flexure may be made not to overlap.

Although not exclusive, the load beam may have further formed at the one end a vertical bent surface, a parallel bent surface, and a contact portion, with the vertical bent surface formed by bending the one end of the load beam perpendicular to the recording medium, the parallel bent surface formed by further bending the one end of the load beam parallel to the recording medium from the vertical bent surface, and the contact portion extending from the vertical bent surface and downward from the mounting surface; and wherein the mounting surface for affixing the flexure thereto forms part of the parallel bent surface.

According to the magnetic head device of the present invention, the flexure has a plurality of attachment pawls, and preferably a positioning hole formed therein, such as in the structure shown in FIG. 1. As shown in the figure, the positioning hole 19 formed in the supporting surface 17 of the flexure 8 is aligned with the positioning hole 13 in the mounting surface 12. Then, the attachment pawls 17a and 17b of the supporting surface 17 are bent onto the mounting surface 12 for retaining it, whereby the flexure 8 is affixed to and supported by the mounting surface 12. Thus, in the present invention, the flexure 8 is easily and reliably affixed to and supported by the mounting surface 12. It is preferable that the attachment pawls be adhered to the mounting surface 12 with an adhesive, such as resin. In this case, the problem of misalignment between the mounting surface 12 and the flexure prior to hardening of the adhesive does not occur.

As shown in FIG. 6, the head body 1, adhered to the bottom surface of the flexure 8, is separated from the attachment pawl 17a closest to the head body 1 by a fixed distance T. In other words, the attachment pawls 17a and 17*b* and the head body 1 are disposed such that they do not overlap. Therefore, even when a jig or the like is used to press the supporting surface 17 and the mounting surface 12 from above and below the two surfaces after aligning the positioning hole 19 in the flexure 8 and the positioning hole 13 in the mounting surface 12, and the attachment pawls 17*a* and 17*b* are bent for caulking them, the head body 1 does not interfere with the jig. Thus, the attachment pawls 17*a* and 17*b* can be bent reliably and easily.

In addition, one end of the load beam is bent into a stepped portion, so that a height is provided from the load beam to the flexure. The lower surface of the stepped portion is formed into a mounting surface for affixing and supporting the flexure. Therefore, an adapter, required conventionally, is no longer necessary. As a result, it is not longer necessary to align the adapter with the load beam and weld them together, which had to be carried out conventionally.

DESCRIPTION OF THE PREFERRED EMBODIMENT

Figure 1:
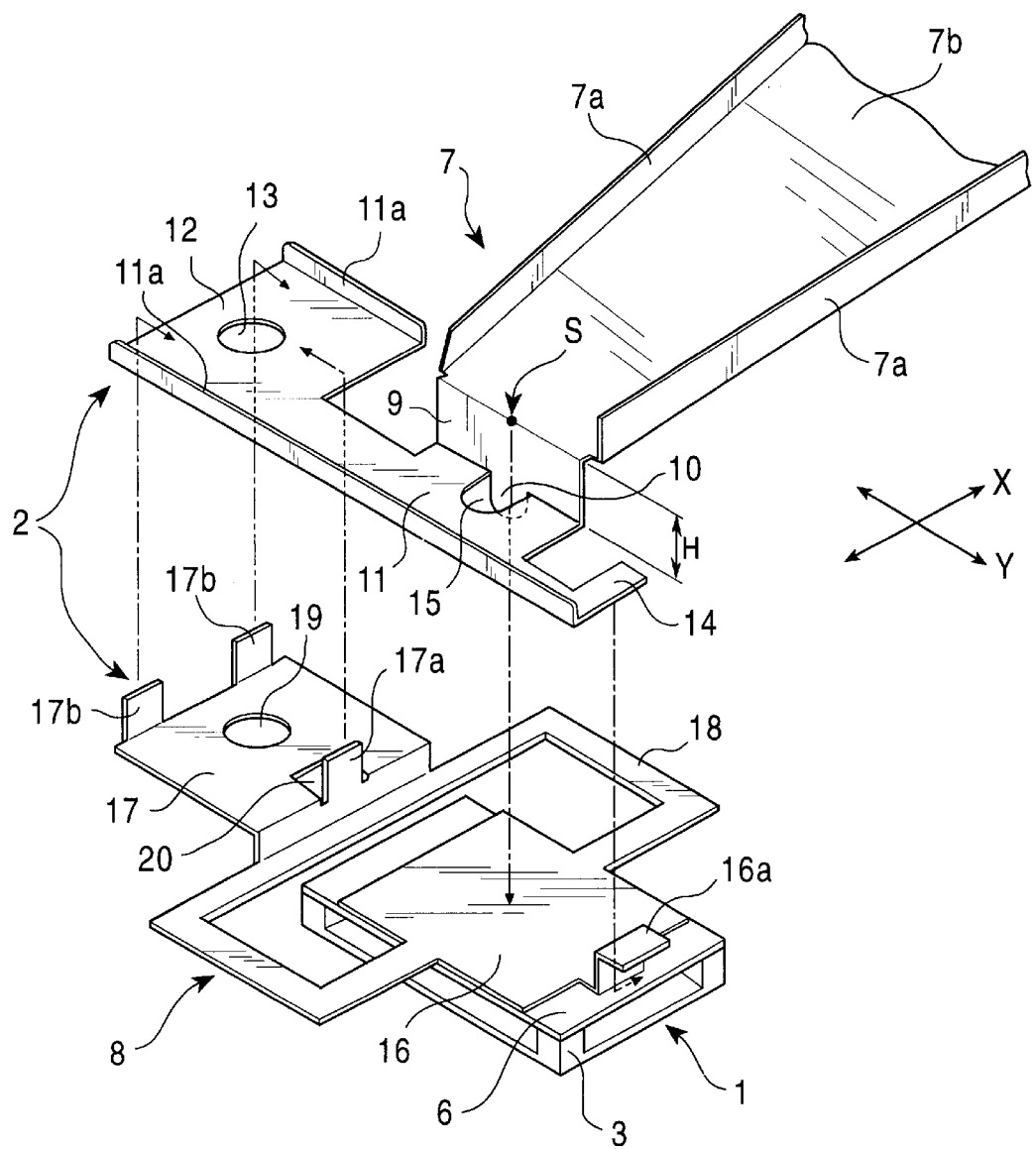
FIG. 1 is a partial exploded perspective view of an embodiment of a floating magnetic head device of a photo-magnetic disk apparatus in accordance with the present invention.
Figure 2:
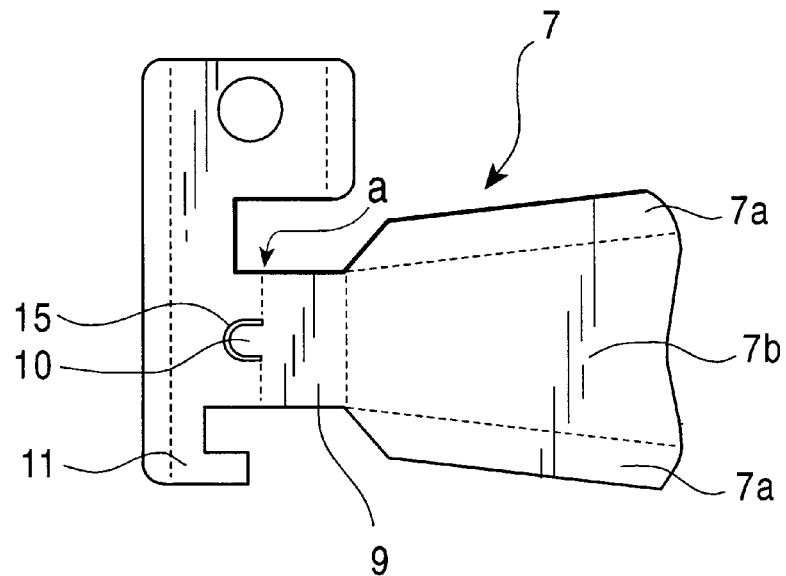
FIG. 2 is a partial view for illustrating how the load beam is formed.
Figure 3:
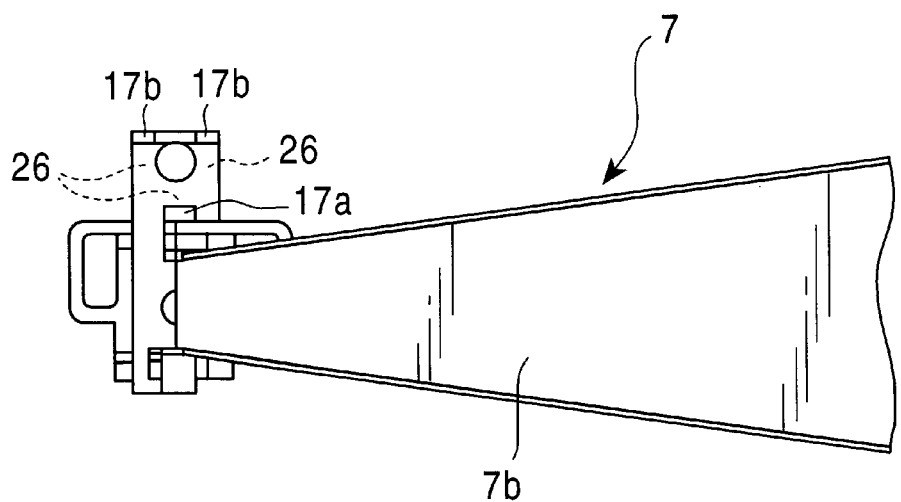
FIG. 3 is a partial plan view of the magnetic head device after assembly.
Figure 4:
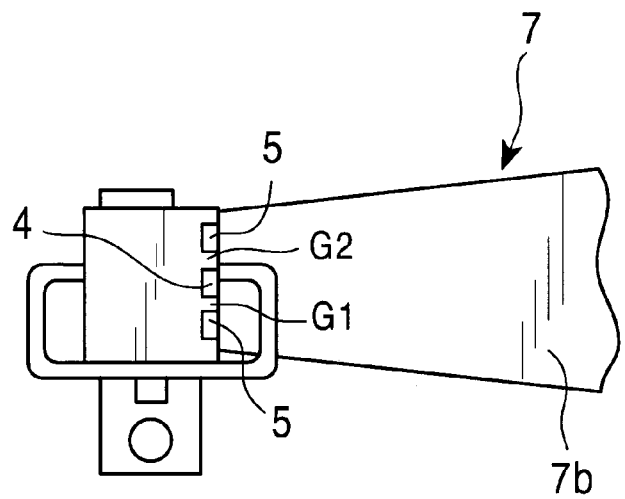
FIG. 4 is a partial bottom view of the magnetic head device after it has been assembled.
Figure 6:
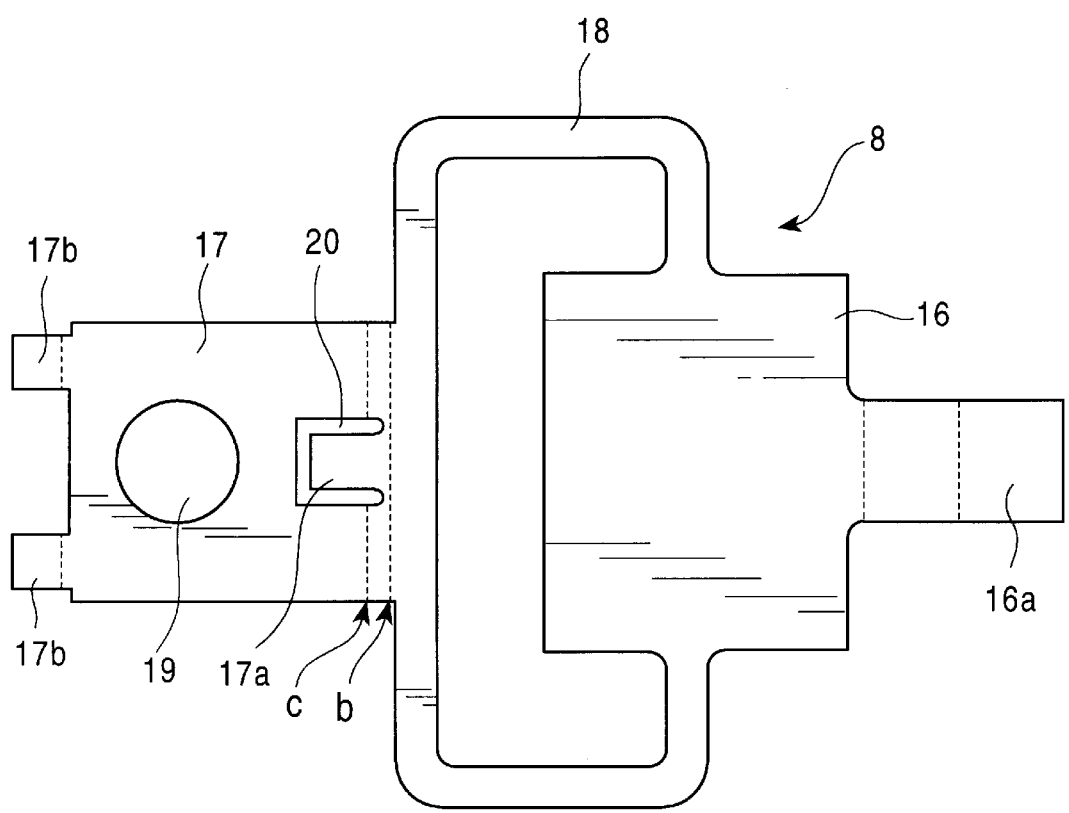
FIG. 6 is a partial view for illustrating how the flexure is formed.
Figure 7:
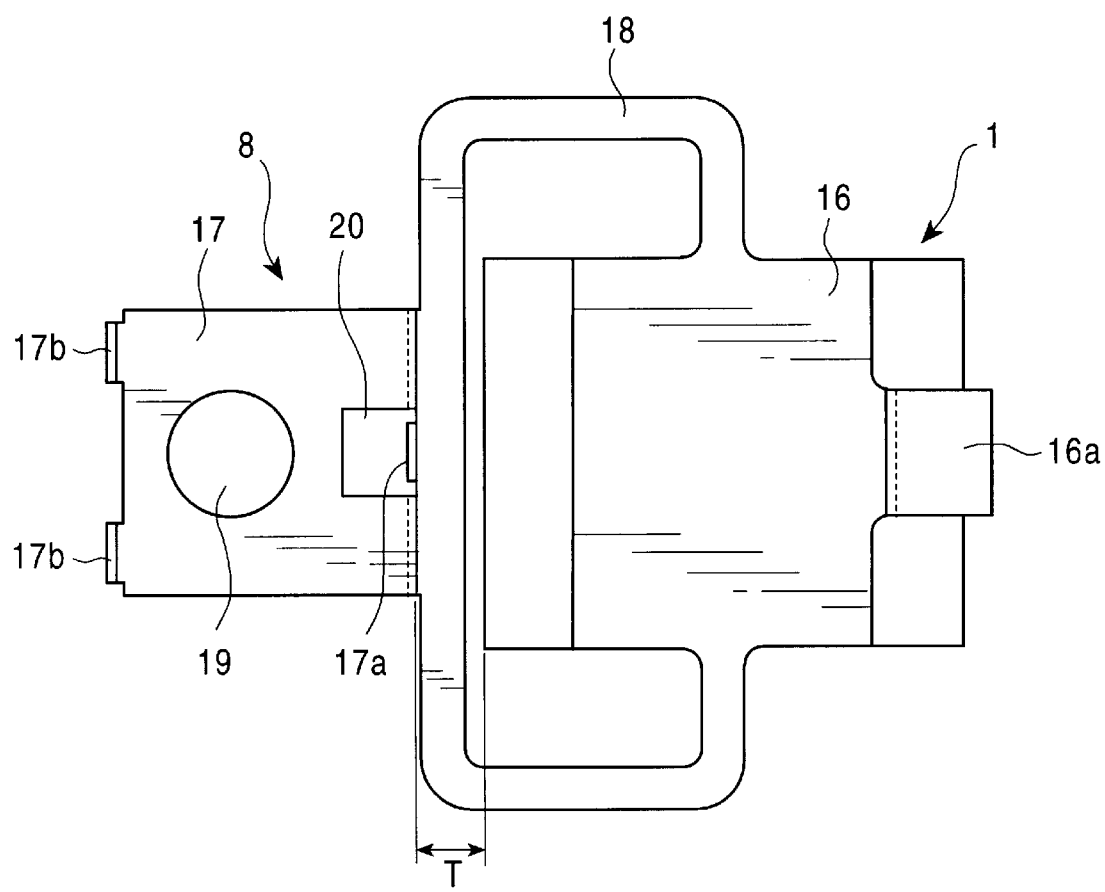
FIG. 7 is a plan view of the flexure and a head body fixed to and supported by the flexure.
Figure 8:
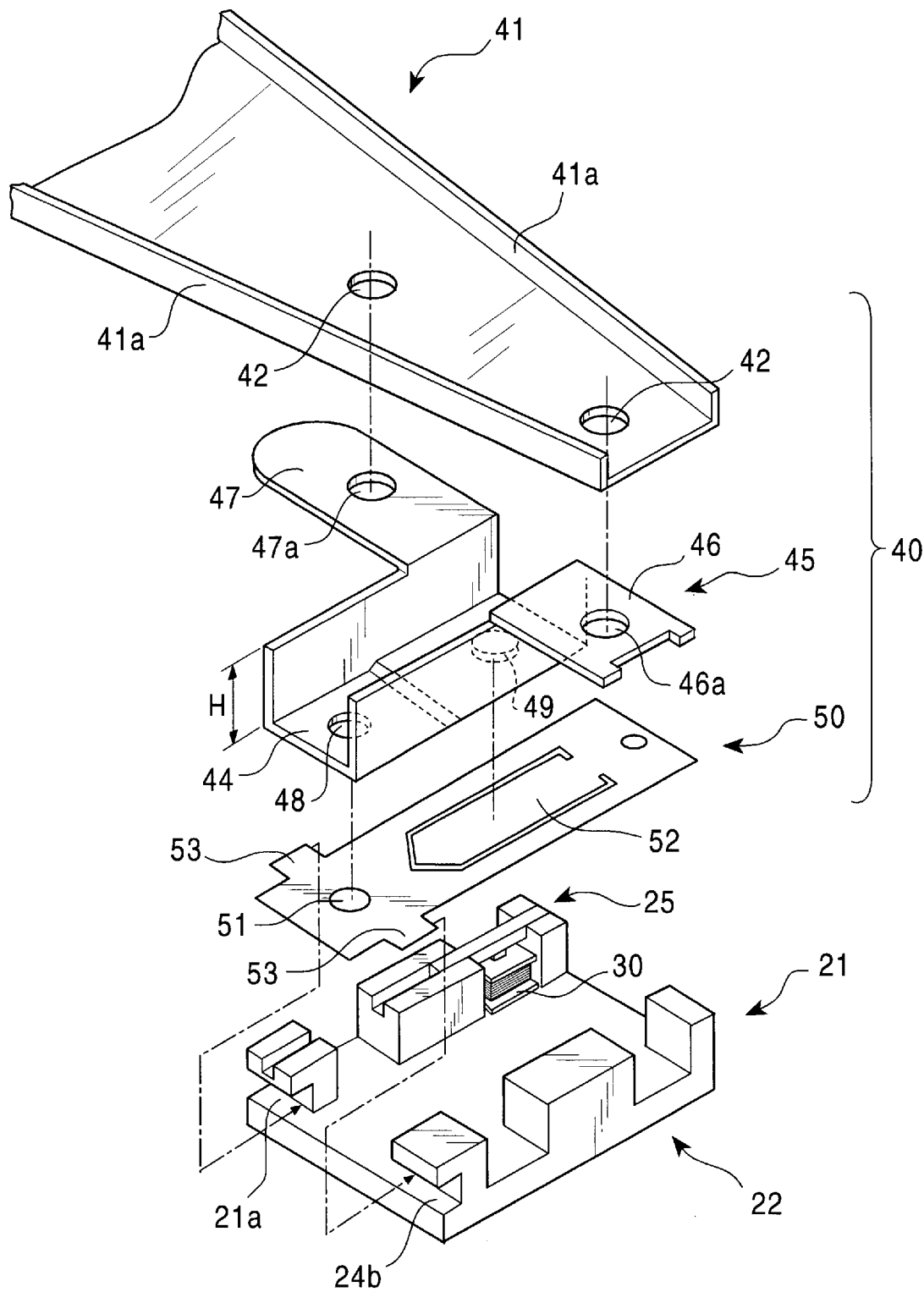
FIG. 8 is a partial exploded perspective view of a conventional magnetic head device.

FIG. 1 is a partial exploded perspective view of an embodiment of a floating magnetic head device of a photo-magnetic disk apparatus in accordance with the present invention. FIG. 2 is a partial view for illustrating how the load beam 7 of FIG. 1 is formed. FIG. 3 is a plan view of the magnetic head device in an assembled state. FIG. 4 is a bottom view of the magnetic head device of FIG. 3. FIG. 6 is a view for illustrating how the flexure is formed. FIG. 7 is a plan view of the flexure and the head body affixed to and supported by the flexure.

The magnetic head device is composed of a head body 1 and a supporting member 2 supporting the head body 1.

The head body 1 is composed of a slider 3, a core assembly, and a back plate 6. The core assembly consists of cores 4 and 5 of FIG. 4, embedded in the slider 3, and a coil. The slider 3 is made of a nonmagnetic ceramic material, such as calcium titanate ($TiCaO_3$), with the bottom side thereof being the side opposing a recording medium, and the top side thereof being the side that is supported by the supporting member 2, in FIG. 1.

Three cutouts (not shown) are formed in the back side of the slider 3 of FIG. 1, with the front core 4 and the side cores 5 being fitted into and affixed to the cutouts. The front core 4 and the side cores 5 are made of magnetic materials, such as manganese-zinc (Mn—Zn) ferrite. As shown in FIG. 4, the bottom surfaces of the cores 4 and 5 are in the same plane as the surface of the slider 3 opposing a recording medium. Gaps G1 and G2 are formed between the front core 4 and the side cores 5 at both sides of the front core 4. A coil, though not illustrated, is wound around the front core 4.

The back plate 6 of FIG. 1 acts as a back core, and is formed by shaping a magnetic material, such as manganese-zinc (Mn—Zn) ferrite into a flat plate. A thin electrical insulation layer (not shown), made of a non-conductive material such as glass ($SiO_2$), is formed at the bottom surface of the back plate 6 in order to reduce the amount of eddy current loss.

Applying a recording current to the coil wound around the front core 4 causes a recording magnetic field to be induced in the front core 4 from the coil. Magnetic field leakage from the magnetic gaps G1 and G2 between the front core 4 and the side cores 5 causes the recording medium to be subjected to a vertical magnetic field. The energy of laser beams is applied from the bottom of the recording medium to record a signal onto the recording medium by either magnetic field modulation or light modulation.

The supporting member 2 is composed of a load beam 7 and a flexure 8.

The load beam 7 is formed of a leaf spring, and, as shown in FIG. 1, has a stepped structure at one end.

Figure 5:
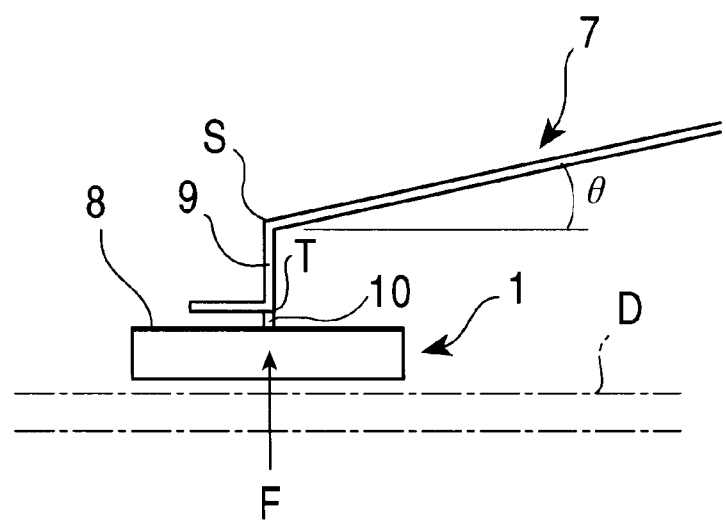
FIG. 5 is a partial side view of the magnetic head device of the present invention floating above a recording medium.

As shown in FIG. 1, the load beam 7 has rigid bent portions 7*a* on both sides, extending from the upper right side to near the aforementioned end, that is from the one end to almost the intermediate portion of the load beam 7. Extending rearwardly from the terminal side of the bent portions 7*a* to the base side of the load beam 7 is the plate spring functioning portion (not shown). As shown in the figure, a flat portion 7*b* is formed between the bent portions 7*a* such that the width of the flat portion 7*b* becomes progressively smaller towards the aforementioned end of the load beam 7. As shown in FIG. 5, the flat portion 7*b* is tilted upward by an angle $\theta$ from a line extending parallel to a disk D.

A vertical bent portion (or first bent surface) 9 extends downwardly from the front end of the flat portion 7*b* and perpendicular to the recording medium. As shown in FIG. 1, it has a height H being the height H of the stepped structure formed by the vertical bent portion 9. A pivot 10, formed integrally with the vertical bent surface 9, protrudes from the center of the bottom surface of the vertical bent surface 9 in a direction perpendicular to the recording medium.

Figure 9:
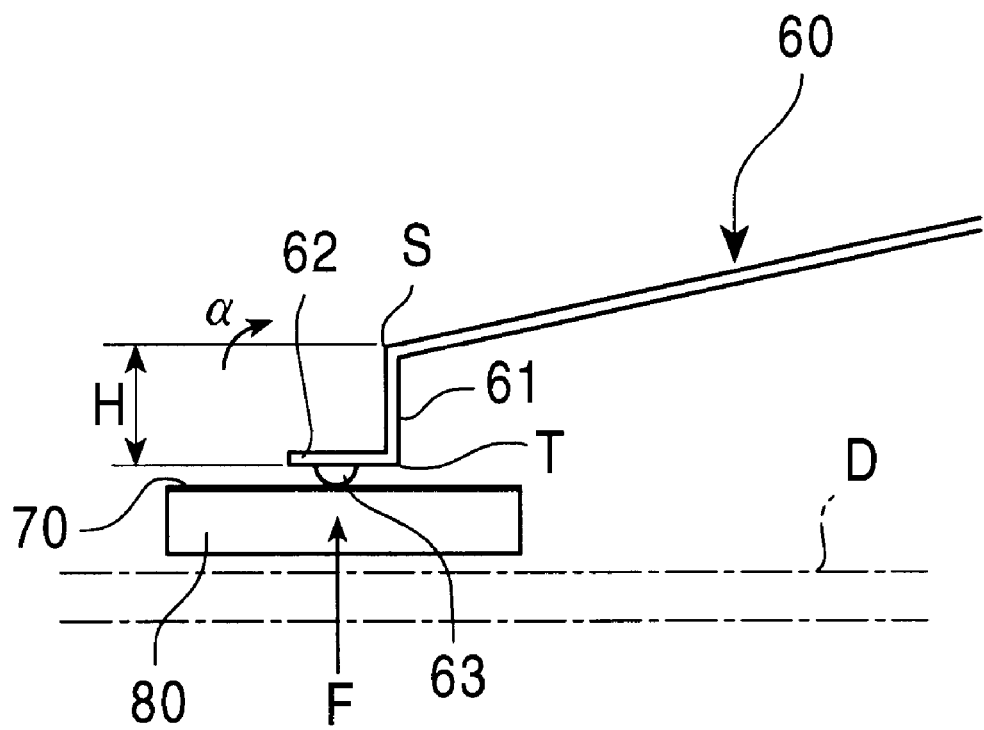
FIG. 9 is a partial side view of the conventional magnetic head device floating above a recording medium.

As shown in FIG. 9, the top portion of the pivot 10 is circular, and contacts virtually the center portion of the upper surface of the head body 1 through the flexure 8.

Although, in the present invention, the form the pivot 10 is not limited to that mentioned above, it is preferable that the top portion of the pivot 10 be circular or V-shaped in order to make the area of contact between the pivot 10 and the flexure 8 as small as possible. By virtue of such a construction, the head body 1 is rockably supported on the top portion of the pivot 10 as fulcrum. In other words, the head body 1 can be rockably supported the more the top portion of the pivot 10 resembles a point.

In the present invention, the pivot 10 is formed integrally with the vertical bent surface 9, and into a flat shape. Therefore, the top portion of the pivot 10 resembles more closely a point, with which the head body 1 contacts through the flexure 8.

As shown in FIG. 1, a parallel bent surface (or a second bent portion) 11 is formed from one end of the vertical bent surface 9 so as to extend parallel to a recording medium and away from the flat portion 7b in the directions of the double-headed arrow Y.

A mounting surface (or projecting surface) 12 projects from the left side of the parallel bent surface 11 of FIG. 1 and towards the rear end of the load beam 7, and has a positioning hole 13 formed therein. The mount surface 12 is the surface which is joined to the flexure 8. On the other hand, a projection 14 projects from the right side of the parallel bent surface 11 of FIG. 1 and towards the rear end of the load beam 7.

Bent portions 11a are formed at the front side of the parallel bent surface 11 and at the rear side of the mounting surface 12, so that no bent portions 11a are formed on the rear side of the projection 14. The bent portions 11a cause the entire parallel bent surface to be formed into a rigid structure.

A cutout 15 is formed in the parallel bent surface 11 so as to be adjacent to the vertical bent surface 9. The cutout 15 is formed with the same exact shape as the aforementioned pivot 10.

As shown in FIG. 2, the load beam 7 is formed of a flat plate. The load beam 7 such as that shown in FIG. 1 is formed by bending a flat plate along the dotted lines by a pressing operation, as shown in FIG. 2.

As shown in FIG. 2, the cutout 15 is formed at the parallel bent surface 11 side of dotted lines a, being the boundary between the vertical bent surface 9 and the parallel bent surface 11. When the cutout 15 is formed, a portion corresponding to the pivot 10 is formed. When this portion is bent downwardly along the dotted lines a of FIG. 2, the aforementioned pivot 10 is formed integrally with the vertical bent surface 9 so as to protrude downwardly of the parallel bent surface 11.

In the present invention, the stepped structure at one end of the load beam 7 has a large height, so that a large load beam 7 height with respect to the head body 1 can be provided. Therefore, in the present invention, an adapter, which was needed in conventional head devices, no longer needs to be used, thus reducing production costs.

In addition, since the stepped portion at one end of the load beam 7 is formed by bending a flat plate by a pressing operation, the load beam 7 can be easily produced, without complicating the production process.

Further, in the magnetic head device of FIG. 1, the portion formed as a result of forming the cutout 15 becomes the pivot 10, which is formed integrally with the vertical bent surface 9 and protrudes downward from the parallel bent surface 11. The parallel bent surface 11 can be formed from the vertical bent surface 9 at locations other than where the pivot 10 is integrally formed with the vertical bent surface 9. In addition, the parallel bent surface 11 and the vertical bent surface 9 can be formed of separate plate materials and affixed together later, by welding or the like.

The flexure 8 is formed of a thin plate spring, and, as shown in FIG. 1, a supporting surface 17 (upper surface) and a resiliently deformable, small width arm 18 are joined together through a stepped portion. A head mounting surface 16 (lower surface) extends from the arm 18, at a side opposing the supporting surface 17.

As shown in FIG. 1, the head body 1 is adhered to the bottom side of the head mounting surface 16, such that the center of the head body 1 and the center of the head mounting surface 16 coincide.

A raised portion 16a is formed at the right side end of the head mounting surface 16 of FIG. 1. When the flexure 8 is affixed to the mounting surface 12, the protrusion 14 is positioned between the upper surface of the head body 1 and the raised portion 16a. When the head body 1 is tilted on the top portion of the pivot 10 as fulcrum, the protrusion 14 restricts the amount of tilting of the head body 1, so that an excessive bending force or twisting force does not act on the arm 18 of the flexure 8.

An attachment pawl 17a and attachment pawls 17b are formed integrally with the supporting surface 17 so that they protrude upward from the supporting surface 17 in FIG. 1. A positioning hole 19 is formed in the supporting surface 17, and is brought into alignment with the positioning hole 13 in the mounting surface 12 of the load beam 7. Although in the present invention any number of attachment pawls 17a and 17b can be formed into any shape at any location, it is preferable that the attachment pawls 17a and 17b be formed in the same plane in such a manner as to oppose each other, in relation to the positioning hole 19, so that they retain the mounting surface 12 of the load beam 7 from both sides. This is because in such a case the attachment pawls can reliably retain the mounting surface 12.

As shown in FIG. 6, the flexure 8 is formed by bending the flat plate of FIG. 6 along the dotted lines.

As shown in FIG. 6, a cutout 20 is formed at the supporting surface 17 side of the dotted lines c. The portion formed as a result of forming the cutout 20 corresponds to the attachment pawl 17a. When the flat plate is bent downwardly along the dotted lines b, and bent upwardly along the dotted lines c, a stepped portion is formed in the flexure 8, and the attachment pawl 17a is faced in a direction perpendicular to the plane of the figure.

In affixing the flexure 8 to the load beam 7 to support it, the positioning hole 13 in the mounting surface 12 of the load beam 7 is brought into alignment with the positioning hole 19 in the supporting surface 17 of the flexure 8. At the same time, the protrusion 14 of the mounting surface 12 of the load beam 7 is inserted below the raised portion 16a formed at the head mounting surface 16 of the flexure 8. Here, the top portion of the pivot 10 formed in the load beam 7 contacts the center of the head mounting surface 16 (or the upper surface of the head body 1). That is, the top portion of the pivot, the center (or center of gravity) of the head mounting surface 16, and virtually the center of the head body 1 line up in a straight line.

The mounting surface 12 of the load beam 7 is interposed between the attachment pawls 17a and 17b on the supporting surface 17 of the flexure 8, and the attachment pawls are bent. Then, as shown in FIG. 3, resin or an adhesive 26 is applied onto or around the bent attachment pawls 17a and 17b to thereby adhere the mounting surface 12 and the attachment pawls 17a and 17b together.

When the magnetic head device is incorporated in a photo-magnetic disk apparatus, the head body 1 enters the disk cartridge from a window of the disk cartridge to contact the upper surface of a disk. The vertical bent surface 9 of the load beam 7 provides a height H through which the head body 1 enters the cartridge.

The head body 1 resiliently presses against the upper surface of a disk as a result of the resilient force of the plate spring functioning portion at the base end of the load beam 7. During disk driving, a floating force, produced by air flowing at the upper surface of the disk D, acts vertically upward on the head body 1, causing it to be in a floated posture, as shown in FIG. 5.

The aforementioned floating force F acts upward on the pivot 10. However, virtually the center of the head body 1, the top portion of the pivot 10, and the fulcrum S at the upper side of the vertical bent surface 9 of FIG. 1 are lined up in a straight line in a direction perpendicular to the recording medium. Therefore, there is no moment is produced by the floating force F with respect to the fulcrum S, so that a tilting force in the rolling direction α, such as that indicated in FIG. 9, is not produced, thereby stabilizing the floating posture of the head body. Consequently, it is possible to stably maintain the magnetic gap in the lower surface of the slider 3 and the space between the disk surface and the head body 1 at all times.

Accordingly, in the magnetic head device of the present invention, attachment pawl 17a and attachment pawls 17b are formed in the flexure 8 in order to retain the mounting surface 12 and be caulked thereto. Therefore, the flexure 8 can be easily and reliably affixed to the mounting surface 12. In addition, when the flexure 8 is being affixed to the mounting surface 12, they do not get misaligned with respect to each other prior to hardening of the adhesive 26. As mentioned above, the load beam 7 can be produced without any welding operation, so that no welding operation is required to produce the magnetic head device of FIG. 1, thereby reducing costs.

FIG. 7 is a plan view showing the head body 1 affixed to and supported by the bottom surface of the head mounting surface 16 of the flexure 8 formed by bending the flat plate of FIG. 6 along the dotted lines.

As shown in FIG. 7, the head body 1 and the attachment pawl 17a disposed closest to the head body 1 is separated by a fixed distance T. In other words, the attachment pawls 17a and 17b and the head body 1 are disposed so that they do not overlap each other. Therefore, after the positioning hole 19 in the supporting surface 17 of the flexure 8 is aligned with the positioning hole 13 in the mounting surface 12 of the load beam 7, and the supporting surface 17 is affixed to the mounting surface 12 by pressing the surfaces from above and below the surfaces, with a jig or the like, the attachment pawls 17a and 17b can be bent without causing the jig or the like to contact the head body 1, so that the flexure 8 and the load beam 7 can be affixed together without damaging the head body 1.

The flexure 8 can be affixed to the load beam 7, with the head body 1 adhered to the flexure 8, so that the head body 1 and the head mounting surface 16 of the flexure 8 can be precisely aligned with respect to each other before they are adhered together.

As can be understood from the foregoing description, according to the present invention, one end of the load beam is formed into a stepped portion which is formed by a first bent surface and a second bent surface, with the first bent surface extending downward and in a direction perpendicular to a recording medium, and the second bent surface extending parallel to the recording medium from one end of the first bent surface. Therefore, an adapter, required in conventional magnetic head devices, is no longer necessary to provide a large load beam height with respect to the head body, thereby reducing the number of parts, making it easier to assemble the magnetic head device, and reducing production costs.

In addition, according to the present invention, a pivot (contact portion) is provided from the center of the bottom surface of the first bent surface, and the center of the upper surface of the first bent surface, acting as a fulcrum, and the top portion of the pivot are lined up in a straight line.

Therefore, when the head body is subjected to a floating force, the floating force acts on the fulcrum, allowing the head body to assume a stable floating posture.

Further, according to the present invention, a cutout is formed at the second bent surface side of a boundary between the first bent surface and the second bent surface. The portion formed by forming the cutout becomes the pivot. Thus, it is easy to form the pivot. The pivot is formed into a flat shape, so that the top portion of the pivot resembles more closely a point where the head body is supported, whereby the head body can rock with greater freedom.

Still further, according to the present invention, the flexure and the mounting surface of the load beam are affixed together by attachment pawls, thereby preventing the load beam and the flexure from getting misaligned with respect to each other when they are being joined together. Consequently, the flexure can be easily and reliably affixed to the load beam. In addition, it is possible to prevent misalignment at the portion where the flexure and the mounting surface are joined together, prior to hardening of an adhesive used to affix the flexure and the mounting surface together.

Still further, according to the present invention, when the attachment pawls and the head body are spaced from each other in a plane, the attachment pawls can be made to retain the mounting surface without damaging the head body, and the head body and the flexure can be positioned very precisely before they are affixed together.

Still further, according to the present invention, one end of the load beam is formed into a stepped portion formed by the vertical bent surface and the mounting surface (parallel bent surface), with the vertical bent surface extending downward in a direction perpendicular to a recording medium, and the mounting surface extending parallel to the recording medium from one end of the vertical bent surface. Thus, an adapter, required conventionally, is no longer required, so that welding does not have to be performed.

What is claimed is:

1. A magnetic head device, comprising:

a head body opposing a recording medium;

a flexure for supporting said head body;

a load beam having integrally formed at one end a first bent surface, a second bent surface, and a contact portion, said first bent surface formed by bending the one end of said load beam in a direction perpendicular to the recording medium, said second bent surface formed by further bending the one end of said load beam parallel to the recording medium from said first bent surface, and said contact portion extending from said first bent surface and downward from said second bent surface:

wherein said flexure is affixed to said second bent surface, and one end of said contact portion contacts the upper surface of said head body;

wherein said head body is supported at the one end of said load beam through said flexure; and wherein a cutout is formed at the second bent surface side of a boundary between said first bent surface and said second bent surface, and wherein said contact portion corresponds to the portion formed by forming said cutout and is formed in the same plane as said first bent surface.

2. A magnetic head device according to claim 1, wherein a top portion of said contact portion and a fulcrum at the upper side of said first bent surface line up in a straight line in a direction perpendicular to the recording medium.

3. A magnetic head device according to claim 1, wherein the contact portion comprises one of a circular or V shape.

4. A magnetic head device comprising:

a head body opposing a recording medium;

a flexure for supporting said head body;

a load beam having integrally formed at one end a first bent surface, a second bent surface, and a contact portion, said first bent surface formed by bending the one end of said load beam in a direction perpendicular to the recording medium, said second bent surface formed by further bending the one end of said load beam parallel to the recording medium from said first bent surface, and said contact portion extending from said first bent surface and downward from said second bent surface;

wherein said flexure is affixed to said second bent surface, and one end of said contact portion contacts the upper surface of said head body;

wherein said head body is supported at the one end of said load beam through said flexure; and wherein a top portion of said contact portion and a fulcrum at an upper side of said first bent surface line up in a straight line in a direction perpendicular to the recording medium.

5. A magnetic head device according to claim 4, wherein the contact portion comprises one of a circular or V shape.

6. A magnetic head device, comprising:

a head body opposing a recording medium;

a flexure for supporting said head body; and a load beam having formed at one end a first bent surface, a second bent surface, and contact portion, said first bent surface formed by bending the one end of said load beam in a direction perpendicular to the recording medium, said second bent surface formed by further bending the one end of said load beam parallel to the recording medium from said first bent surface, and said contact portion extending from said first bent surface and downward from said second bent surface, wherein said flexure is affixed to said second bent surface, and one end of said contact portion contacts the upper surface of said head body, wherein said head body is supported at the one end of said load beam through said flexure, and wherein a cutout is formed at the second bent surface side of a boundary between said first bent surface and said second bent surface, and wherein said contact portion corresponds to the portion formed by forming said cutout and is formed in the same plane as said first bent surface.

7. A magnetic head device according to claim 6, wherein the top portion of said contact portion and a fulcrum at the upper side of said first bent surface line up in a straight line in a direction perpendicular to the recording medium.

8. A magnetic head device according to claim 6, wherein the contact portion comprises one of a circular or V shape.

9. A magnetic head device, comprising:

a head body opposing a recording medium;

a flexure for supporting said head body; and a load beam having formed at one end a first bent surface, a second bent surface, and contact portion, said first bent surface formed by bending the one end of said load beam in a direction perpendicular to the recording medium, said second bent surface formed by further bending the one end of said load beam parallel to the recording medium from said first bent surface and downward from said second bent surface, wherein said flexure is affixed to said second bent surface, and one end of said contact portion contacts the upper surface of said head body, wherein said head body is supported at the one end of said load beam through said flexure, and wherein the top portion of said contact portion and a fulcrum at the upper side of said first bent surface line up in a straight line in a direction perpendicular to the recording medium.

10. A magnetic head device according to claim 9, wherein the contact portion comprises one of a circular or V shape.

* * * * *